United States Patent
Ouyang et al.

(10) Patent No.: US 12,229,330 B2
(45) Date of Patent: Feb. 18, 2025

(54) FACIAL IMAGE GENERATION METHOD AND APPARATUS, ELECTRONIC DEVICE, AND READABLE STORAGE MEDIUM

(71) Applicant: VIVO MOBILE COMMUNICATION CO., LTD., Dongguan (CN)

(72) Inventors: Lingqu Ouyang, Dongguan (CN); TikFan Chan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 22 days.

(21) Appl. No.: 17/984,212

(22) Filed: Nov. 9, 2022

(65) Prior Publication Data
US 2023/0085099 A1   Mar. 16, 2023

Related U.S. Application Data

(63) Continuation of application No. PCT/CN2021/091859, filed on May 6, 2021.

(30) Foreign Application Priority Data

May 9, 2020   (CN) .......................... 202010386661.8

(51) Int. Cl.
*G06F 3/01*   (2006.01)
*G06V 40/16*   (2022.01)

(52) U.S. Cl.
CPC ............ *G06F 3/011* (2013.01); *G06V 40/174* (2022.01)

(58) Field of Classification Search
CPC .. G06F 3/011; G06V 40/174; G06K 9/00268; G06T 13/40; G06T 7/73; G06T 2215/16
See application file for complete search history.

(56) References Cited

U.S. PATENT DOCUMENTS

| | | | | |
|---|---|---|---|---|
| 11,538,211 B2* | 12/2022 | Hefny | ........................ | G06T 7/13 |
| 2011/0007174 A1* | 1/2011 | Bacivarov | ................ | G06T 7/40 |
| | | | | 348/222.1 |
| 2013/0315468 A1* | 11/2013 | Toyoda | ................... | G06T 7/001 |
| | | | | 382/147 |

(Continued)

FOREIGN PATENT DOCUMENTS

| | | |
|---|---|---|
| CN | 107491165 A | 12/2017 |
| CN | 108241434 A | 7/2018 |

(Continued)

OTHER PUBLICATIONS

First Office Action issued in related Chinese Application No. 202010386661.8, mailed Jan. 28, 2023, 6 pages.

(Continued)

*Primary Examiner* — Abderrahim Merouan
(74) *Attorney, Agent, or Firm* — IPX PLLC

(57) ABSTRACT

A facial image generation method, an electronic device, and a non-transitory computer-readable storage medium are provided. The method includes: obtaining a facial contour of a target user wearing an Augmented Reality (AR) device; determining a facial angle of the target user based on the facial contour, where the facial angle includes an angle between a face orientation of the target user and the electronic device; obtaining a target facial expression; and generating a facial image of the target user based on the target facial expression and the facial angle.

12 Claims, 3 Drawing Sheets

(56) References Cited

U.S. PATENT DOCUMENTS

| | | | |
|---|---|---|---|
| 2016/0007015 A1* | 1/2016 | Kim | G09G 3/36 |
| | | | 348/51 |
| 2016/0188860 A1* | 6/2016 | Lee | G06F 21/32 |
| | | | 726/18 |
| 2016/0364602 A1 | 12/2016 | Kim et al. | |
| 2018/0052841 A1 | 2/2018 | Chen et al. | |
| 2018/0101637 A1* | 4/2018 | Kim | G06F 30/398 |
| 2019/0279393 A1* | 9/2019 | Ciuc | G06T 13/40 |
| 2019/0286798 A1 | 9/2019 | Kim | |
| 2020/0090392 A1* | 3/2020 | Chou | G06V 40/174 |

FOREIGN PATENT DOCUMENTS

| | | |
|---|---|---|
| CN | 108614638 A | 10/2018 |
| CN | 108875633 A | 11/2018 |
| CN | 109101953 A | 12/2018 |
| CN | 109166164 A | 1/2019 |
| CN | 111583355 A | 8/2020 |
| JP | 2011170891 A | 9/2011 |
| KR | 20160135652 A | 11/2016 |
| WO | 2019217177 A1 | 11/2019 |

OTHER PUBLICATIONS

International Search Report issued in corresponding International Application No. PCT/CN2021/091859, mailed Jul. 30, 2021, 4 pages.
Extended European Search Report issued in related European Application No. 21804806.4, mailed Oct. 17, 2023, 7 pages.
Second Office Action issued in related Chinese Application No. 202010386661.8, mailed Sep. 29, 2023, 6 pages.
Search Report issued in related Chinese Application No. 202010386661.8, mailed Dec. 21, 2023, 3 pages.
Fang-lin Yuan et al, "Data obtain and automatic orientation of 3D facial model", Computer Engineering and Design, vol. 27, No. 16, Aug. 2006.
Notice of Reason of Refusal issued in related Japanese Application No. 2022-567137, mailed Jan. 9, 2024, 2 pages.
Office Action issued in related Korean Application No. 10-2022-7042575, mailed Aug. 6, 2024, 6 pages.

* cited by examiner

FACIAL IMAGE GENERATION METHOD AND APPARATUS, ELECTRONIC DEVICE, AND READABLE STORAGE MEDIUM

CROSS-REFERENCE TO RELATED APPLICATIONS

This application is a continuation of International Application No. PCT/CN2021/091859, filed on May 6, 2021, which claims priority to Chinese Patent Application No. 202010386661.8 filed on May 9, 2020. The entire contents of each of the above-referenced applications are expressly incorporated herein by reference.

TECHNICAL FIELD

Embodiments of this application relate to the communications field, and in particular, to a facial image generation method and apparatus, an electronic device, and a readable storage medium.

BACKGROUND

In a scenario in which an existing Augmented Reality (AR) technology is used for interaction, a user needs to wear an AR device. The AR device shields a face of the user, and consequently, the face of the user cannot be seen, and the user cannot be identified. A current processing manner is as follows: A user image is replaced with a pre-recorded virtual image by capturing of a user action. However, a preset virtual image is relatively fixed, and the face has only a simple speaking action, and an expression cannot be made. Consequently, AR interaction experience of the user is poor.

SUMMARY

Embodiments of this application are to provide a facial image generation method and apparatus, an electronic device, and a readable storage medium.

This application is implemented as follows:

According to a first aspect, an embodiment of this application provides a facial image generation method performed by an electronic device, and the method includes:

obtaining a facial contour of a target user wearing an AR device;

determining a facial angle of the target user based on the facial contour, where the facial angle includes an angle between a face orientation of the target user and the electronic device;

obtaining a target facial expression; and generating a facial image of the target user based on the target facial expression and the facial angle.

According to a second aspect, an embodiment of this application provides a facial image generation apparatus performed by an electronic device, including:

a first obtaining module, configured to obtain a facial contour of a target user wearing an AR device;

a determining module, configured to determine a facial angle of the target user based on the facial contour, where the facial angle includes an angle between a face orientation of the target user and the electronic device;

a second obtaining module, configured to obtain a target facial expression; and a generation module, configured to generate a facial image of the target user based on the target facial expression and the facial angle.

According to a third aspect, an embodiment of this application provides an electronic device, including: a processor, a memory, and a program or an instruction that is stored in the memory and that can run on the processor, where when the program or the instruction is executed by the processor, steps in the facial image generation method according to the first aspect are implemented.

According to a fourth aspect, an embodiment of this application provides a readable storage medium, where the readable storage medium stores a program or an instruction, and the program or the instruction is executed by a processor, to implement steps in the facial image generation method according to the first aspect.

According to a fifth aspect, an embodiment of this application provides a chip, where the chip includes a processor and a communications interface, the communications interface is coupled to the processor, and the processor is configured to run a program or an instruction to implement the method according to the first aspect.

According to a sixth aspect, an embodiment of this application provides a computer software product, where the computer software product is stored in a non-volatile storage medium, and the software product is configured to be executed by at least one processor to implement steps in the facial image generation method according to the first aspect.

According to a seventh aspect, an embodiment of this application provides a facial image generation apparatus, where the facial image generation apparatus is configured to perform the facial image generation method according to the first aspect.

DETAILED DESCRIPTION

The following describes the technical solutions in the embodiments of this application with reference to the accompanying drawings in the embodiments of this application. Apparently, the described embodiments are some rather than all of the embodiments of the present disclosure. Based on the embodiments of the present disclosure, all other embodiments obtained by a person of ordinary skill in the art without creative efforts fall within the protection scope of the present disclosure.

Terms "first" and "second" in the specification and claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and the character "I" generally represents an "or" relationship between associated objects.

With reference to the accompanying drawings, a facial image generation method provided in embodiments of this application is described in detail below by using an embodiment and an application scenario thereof.

In embodiments of this application, an AR interaction scenario may be an AR-based conference, that is, a participant performs conference discussion and interaction by wearing an AR device, or the AR interaction scenario may be a leisure scenario such as a remote role play game or story telling for a child in a different place.

An embodiment of this application provides a facial image generation method, and the method is performed by an electronic device.

The electronic device is a device with a camera. AR interaction is performed with reference to an AR technology based on an image obtained by the camera. The electronic device may be an AR device, such as AR glasses, or the electronic device may be a mobile phone, a computer, or the like. A type of the electronic device is not limited in this embodiment of this application.

Figure 1:
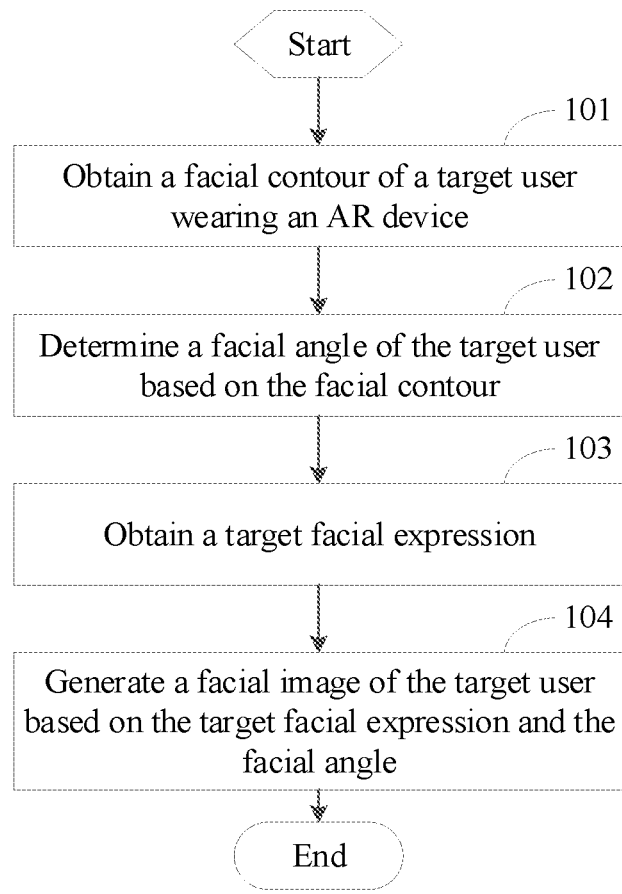
FIG. 1 is a schematic flowchart of a facial image generation method according to an embodiment of this application.

As shown in FIG. 1, the method includes the following steps:

Step 101: Obtain a facial contour of a target user wearing an AR device.

In this embodiment of this application, the target user refers to an object that performs AR interaction. For example, in an AR conference, the target user may be a spokesperson wearing the AR device. In some embodiments, the facial contour of the target user may be obtained in multiple manners. For example, the facial contour of the target user may be obtained by using an AR device with a camera, or may be obtained by using a device such as a mobile phone or a computer with a camera, or the facial contour of the target user may be recorded by separately disposing a camera, and then a recorded image is transmitted to an apparatus used for display.

In some implementations, the obtaining a facial contour of a target user wearing an AR device includes:
obtaining a facial image of the target user by using a camera, performing contour imaging of different depths of field for multiple times within a depth of field range from a nearest point between the camera and the face of the target user to the nearest point plus a preset distance, and then superposing multiple obtained contour images to obtain the facial contour of the target user.

In this embodiment of this application, the facial nearest point is a point on the face of the user that is closest to the camera when the facial image of the target user is obtained by using the camera. For example, when the face of the target user faces the camera, the facial nearest point corresponds to the tip of nose of the target user. The preset distance corresponds to a distance of width of the head of the target user, and the distance of width of the head may be set based on an average head width of a person.

In a depth of field range from the facial nearest point to the facial nearest point plus one head width, multiple contour images in different depths of field are separately obtained, and then the contour images in different depths of field are superposed and synthesized. In this way, a relatively accurate facial contour of the target user can be obtained. The facial contour can reflect a facial shape of the target user and a face orientation angle.

Step 102: Determine a facial angle of the target user based on the facial contour.

In this embodiment of this application, the facial angle includes an angle between a face orientation of the target user and the electronic device. The facial angle is used to reflect a facial posture of the face of the target user relative to the electronic device. For example, if it is determined, based on the facial contour of the target user, that the face of the target user is upturned by 30 degrees in a direction opposite to the electronic device, it may indicate that in this case, the facial posture of the target user is 30 degrees in an upturned face. Further, for a more complex facial angle, for example, the face of the target user is inclined in an oblique direction, the facial angle of the target user may be calculated based on an existing spatial angle algorithm by using deflection angles of the face of the target user toward the electronic device in multiple directions (such as a horizontal direction and a vertical direction).

In some implementations, the determining a facial angle of the target user based on the facial contour includes: matching, in a facial contour database, a facial angle corresponding to the facial contour; where the facial contour database includes a facial contour of the target user that is recorded from multiple facial angles in advance.

In this embodiment of this application, the facial contour of the target user may be recorded in advance from multiple angles, and a facial contour database is generated based on the recorded facial contour. Different facial contours in the facial contour database respectively correspond to different facial angles. In this way, after the facial contour of the target user is obtained, a corresponding facial angle may be directly matched in the facial contour database.

Step 103: Obtain a target facial expression.

In this embodiment of this application, the target facial expression is a facial expression used to generate a face image of the target user. The target facial expression may be an expression of the target user, may be an expression of another user, or may be an expression of some cartoon images obtained from a network.

Step 104: Generate a facial image of the target user based on the target facial expression and the facial angle.

In this embodiment of this application, the facial image of the target user is generated based on the determined facial angle by using the selected target facial expression. In this way, an angle of the generated facial image can be consistent with a current facial angle of the target user, so that the facial image is closer to the face of the target user.

In this embodiment of the present disclosure, the facial angle of the target user is determined based on the facial contour of the target user wearing the AR device, and the facial image of the target user is generated based on the facial angle of the target user and the obtained target facial expression. In this way, during AR interaction, the facial image of the user can be displayed, and the user can be expressed by using different facial expressions based on different target facial expressions, to improve AR interaction experience.

For example, in some implementations, the obtaining a target facial expression includes: obtaining a facial expression of the target user that is recorded by the AR device.

In this embodiment of this application, if the AR device worn by the target user has an image obtaining function, for example, the AR device is AR glasses with a camera, the AR device worn by the target user may directly record and scan the facial expression of the target user in real time, and use the recorded facial expression as the target facial expression, to generate the facial image of the target user.

For example, in some implementations, the obtaining a target facial expression includes: obtaining input information of the target user, and matching a facial expression corresponding to context of the input information from a facial expression database; where the facial expression database includes multiple facial expressions at multiple facial angles.

In this embodiment of this application, if the AR device worn by the target user does not have an image obtaining function, various expressions of the target user at various angles may be recorded in advance, for example, no expression, angry, happy, depressed, sad, serious, and suspicious, and correspondingly, a corresponding label is set for each expression.

During AR interaction, the input information of the target user is obtained. The input information may be text entered by the target user, or may be voice entered by the target user. Context recognition is performed based on the input information, and then a corresponding label is selected from the facial expression database based on the context, and a corresponding face expression is matched. For example, if the target user says "I am very happy today", based on context recognition, context in this case should be corresponding to a happy label, and a facial expression with the happy label is selected from the facial expression database.

It may be understood that the facial expression database may also store multiple facial expressions of some other objects at multiple facial angles, for example, cartoon characters such as animals such as cats and dogs, Superman, and Iron Man. In this way, the facial image of the target user may be replaced with a cartoon image in a remote role play game or in a leisure scenario such as story telling for a child in a different place, to improve an AR interaction effect.

Further, before the generating a facial image of the target user based on the target facial expression and the facial angle, the method further includes at least one of the following:

(1) A mouth state of the target user is obtained, and a mouth state of the target facial expression is adjusted based on the mouth state of the target user.

In this embodiment of this application, the mouth state of the target user is used to reflect a mouth action of the target user, for example, open the mouth, close the mouth, sip the mouth, and tilt the mouth to one side. The mouth state of the target facial expression is adjusted by using the mouth state of the target user, so that the target facial expression can accurately and synchronously display a fine expression action of the target user, and facial expressions are more abundant.

(2) A voice tone of the target user is obtained, and an expression amplitude of the target facial expression is adjusted based on the voice tone.

In this embodiment of this application, the voice tone of the target user is used to reflect an emotional state of the target user, and may be further used to determine an amplitude of a target expression. For example, degree 1 to degree 10 respectively correspond to ten moments from no expression to a happy expression during expression recording. As the voice tone of the target user raises, a later expression is used. In this way, the expression amplitude of the target facial expression is adjusted by using the voice tone, so that the target facial expression can accurately display an emotional state of the target user, and facial expressions are more abundant.

For example, in some implementations, there are multiple target users wearing the AR device, and facial images need to be generated. The target users may be bound with a facial image generation function by using a preset gesture action. For example, the AR device randomly generates a group of gestures, such as stone, paper, and scissors. In this case, a person who needs to be bound with the facial image generation function needs to raise a hand and do the gestures in a specified order to confirm. In this way, facial image generation in an AR interaction process can be more flexible.

For example, in some implementations, the target user needs to temporarily process another transaction. To avoid affecting another user in an AR conference, the target user may lock a current facial image, to avoid impact on another person caused by a change of the facial image during processing of another transaction. For example, in a scenario of the AR conference, if one participant needs to temporarily process another transaction, the participant may lock a facial image, to prevent a case that due to a change of the facial image during processing of another transaction, another participant considers, by mistake, that he is expressing his opinions.

For example, in some implementations, the method further includes: receiving a first input of the target user; and replacing the facial image of the target user with a preset image in response to the first input; where the preset image includes at least one of the following: a cartoon emoticon image; and an image corresponding to the input information of the target user, where the image corresponding to the input information may be an icon.

Figure 2A:
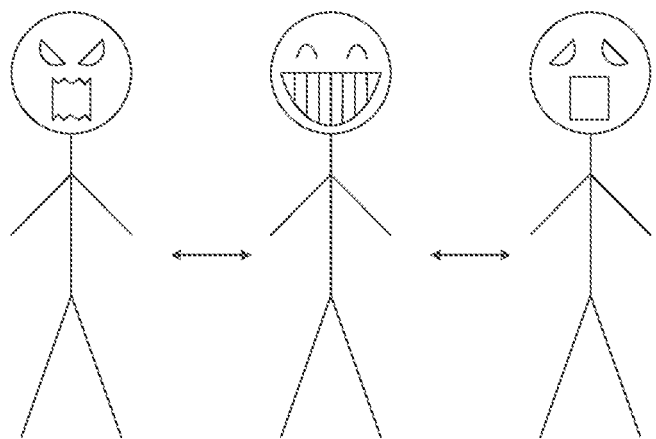
FIG. 2a is a first schematic diagram of an application scenario according to an embodiment of this application.
Figure 2B:
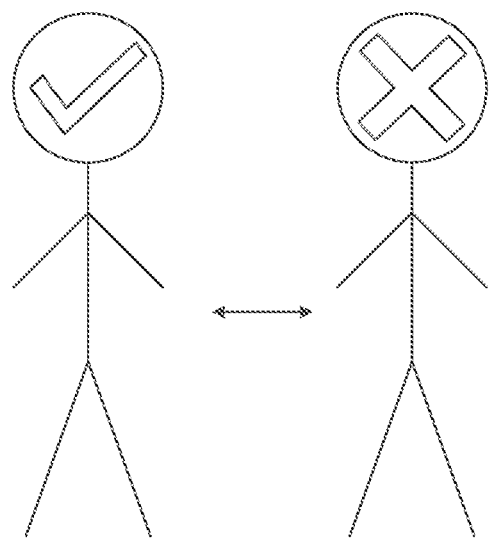
FIG. 2b is a second schematic diagram of an application scenario according to an embodiment of this application.

In this embodiment of this application, the target user may replace the facial image with the preset image. For example, as shown in FIG. 2a, the facial image is replaced with a cartoon emoticon image, such as an emoji or a popular Internet meme, to achieve an exaggerated expression effect and improve interest in the AR conference. For another example, as shown in FIG. 2b, during voting, a result is directly replaced with a facial image, that is, an icon of "√" or "x" is used to replace the facial image.

It should be noted that, the facial image generation method provided in this embodiment of this application may be performed by a facial image generation apparatus, or a control module, in the facial image generation apparatus, configured to perform and load the facial image generation method. In this embodiment of this application, an example in which the facial image generation apparatus performs and loads the facial image generation method is used to describe facial image generation provided in this embodiment of this application.

Figure 3:
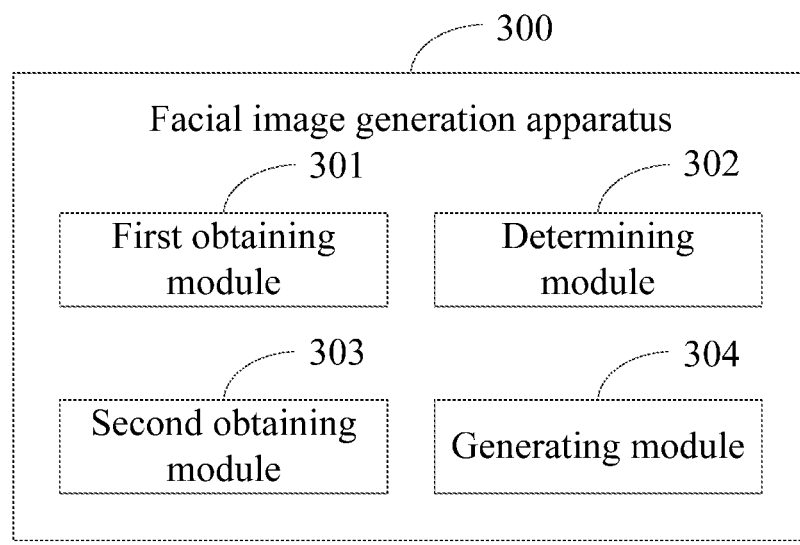
FIG. 3 is a schematic diagram of a structure of a facial image generation method according to an embodiment of this application.

As shown in FIG. 3, an embodiment of this application provides a facial image generation apparatus 300 applied to an electronic device, including:
   a first obtaining module 301, configured to obtain a facial contour of a target user wearing an AR device;
   a determining module 302, configured to determine a facial angle of the target user based on the facial contour, where the facial angle includes an angle between a face orientation of the target user and the electronic device;
   a second obtaining module 303, configured to obtain a target facial expression; and
   a generation module 304, configured to generate a facial image of the target user based on the target facial expression and the facial angle.

For example, the first obtaining module 301 includes:
   a first matching unit, configured to match, in a facial contour database, a facial angle corresponding to the facial contour; where the facial contour database includes a facial contour of the target user that is recorded from multiple facial angles in advance.

For example, the second obtaining module 303 includes:
a first obtaining unit, configured to obtain a facial expression of the target user that is recorded by the AR device;
a second obtaining unit, configured to obtain input information of the target user; and
a second matching unit, configured to match a facial expression corresponding to context of the input information from a facial expression database; where the facial expression database includes multiple facial expressions at multiple facial angles.

For example, the apparatus 300 further includes:
a third obtaining module, configured to obtain a mouth state of the target user;
a first adjustment module, configured to adjust a mouth state of the target facial expression based on the mouth state of the target user; and
a fourth obtaining module, configured to obtain a voice tone of the target user; where the first adjustment module is configured to adjust an expression amplitude of the target facial expression based on the voice tone.

For example, the apparatus 300 further includes:
a receiving module, configured to receive a first input of the target user; and
a replacement module, configured to replace the facial image of the target user with a preset image in response to the first input; where the preset image includes at least one of the following:
a cartoon emoticon image; and
an image corresponding to input information of the target user.

In this embodiment of the present disclosure, the facial angle of the target user is determined based on the facial contour of the target user wearing the AR device, and the facial image of the target user is generated based on the facial angle of the target user and the obtained target facial expression. In this way, during AR interaction, the facial image of the user can be displayed, and the user can be expressed by using different facial expressions based on different target facial expressions, to improve AR interaction experience.

The facial image generation apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an Ultra-Mobile Personal Computer (UMPC), a netbook, or a Personal Digital Assistant (PDA), and the non-mobile electronic device may be a server, a Network Attached Storage (NAS), a Personal Computer (PC), a television (TV), a counter, or a self-service machine. This is not specifically limited in this embodiment of this application.

The facial image generation apparatus in this embodiment of this application may be an apparatus with an operating system. The operating system may be an Android operating system, may be an iOS operating system, or may be another possible operating system. This is not specifically limited in this embodiment of this application.

The facial image generation apparatus provided in this embodiment of this application can implement processes implemented by the facial image generation apparatus in the method embodiments of FIG. 1 to FIG. 2*b*. To avoid repetition, details are not described herein again.

For example, an embodiment of this application further provides an electronic device, including a processor 410, a memory 409, and a program or an instruction that is stored in the memory 409 and that can run on the processor 410. When the program or the instruction is executed by the processor 410, processes of the facial image generation embodiment can be implemented, and a same technical effect can be achieved. To avoid repetition, details are not described herein.

It should be noted that the electronic device in this embodiment of this application includes the foregoing mobile electronic device and the foregoing non-mobile electronic device.

Figure 4:
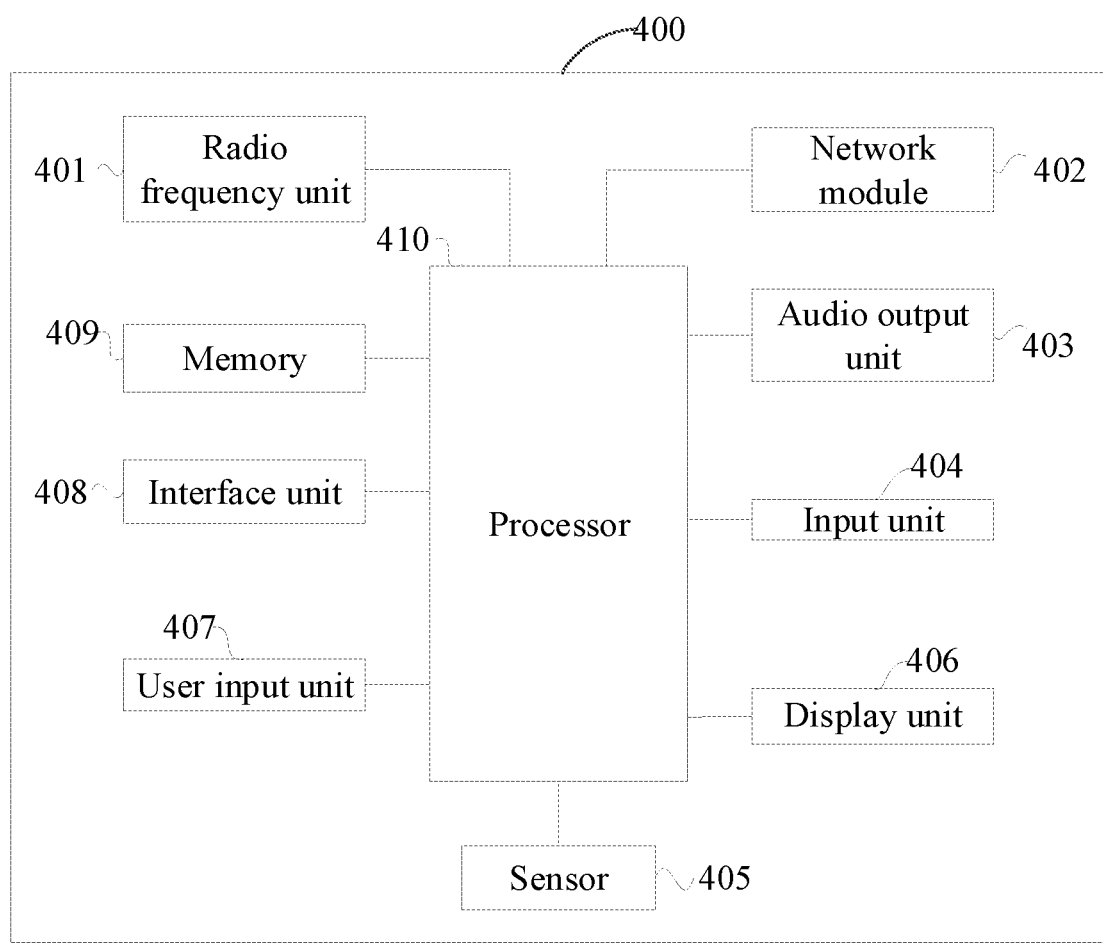
FIG. 4 is a schematic diagram of a structure of an electronic device according to an embodiment of this application.

FIG. 4 is a schematic diagram of a hardware structure of an electronic device for implementing embodiments of this application.

The electronic device 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

It may be understood by a person skilled in the art that the electronic device 400 may further include a power supply (such as a battery) that supplies power to each component. The power supply may be logically connected to the processor 410 by using a power management system, to implement functions such as charging, discharging, and power consumption management by using the power management system. A structure of the electronic device shown in FIG. 4 does not constitute a limitation on the electronic device, and may include more or fewer parts than those shown in the figure, or combine some components, or have different part arrangements. Details are not described herein again.

The input unit 404 may be a camera, and is configured to obtain a facial contour of a target user wearing an AR device.

The processor 410 is configured to determine a facial angle of the target user based on the facial contour, where the facial angle includes an angle between a face orientation of the target user and the electronic device.

The input unit 404 is further configured to obtain a target facial expression.

The processor 410 is configured to generate a facial image of the target user based on the target facial expression and the facial angle.

In this embodiment of the present disclosure, the facial angle of the target user is determined based on the facial contour of the target user wearing the AR device, and the facial image of the target user is generated based on the facial angle of the target user and the obtained target facial expression. In this way, during AR interaction, the facial image of the user can be displayed, and the user can be expressed by using different facial expressions based on different target facial expressions, to improve AR interaction experience.

For example, the processor 410 is further configured to match, in a facial contour database, a facial angle corresponding to the facial contour; where
the facial contour database includes a facial contour of the target user that is recorded from multiple facial angles in advance.

For example, the input unit 404 is further configured to: obtain a facial expression of the target user that is recorded by the AR device; or obtain input information of the target user, and match a facial expression corresponding to context of the input information from a facial expression database; where
the facial expression database includes multiple facial expressions at multiple facial angles.

For example, the input unit 404 is further configured to: obtain a mouth state of the target user, and adjust a mouth state of the target facial expression based on the mouth state of the target user.

The input unit 404 is further configured to: obtain a voice tone of the target user, and adjust an expression amplitude of the target facial expression based on the voice tone.

For example, the user input unit 407 is configured to receive a first input of the target user.

The processor 410 is further configured to replace the facial image of the target user with a preset image in response to the first input; where the preset image includes at least one of the following: a cartoon emoticon image; and an image corresponding to input information of the target user.

An embodiment of this application further provides a readable storage medium. A program or an instruction is stored in the readable storage medium. When the program or the instruction is executed by a processor, processes of the foregoing embodiments of the facial image generation method can be implemented, and a same technical effect can be achieved. To avoid repetition, details are not described herein.

The processor is a processor in the electronic device in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip. The chip includes a processor and a communications interface, the communications interface is coupled to the processor, and the processor is configured to run a program or an instruction to implement the processes of the foregoing embodiments of the facial image generation method, and a same technical effect can be achieved. To avoid repetition, details are not described herein again.

It should be understood that the chip mentioned in the embodiments of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the application and design constraints of the technical solution. A person skilled in the art may use different methods for each particular application to implement the described functions, but such implementation shall not be considered to be outside the scope of the present disclosure.

It may be clearly understood by a person skilled in the art that, for convenience and brevity of description, for a working process of the foregoing described system, apparatus, and unit, reference may be made to a corresponding process in the foregoing method embodiments, and details are not described herein again.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each unit may exist separately physically, or two or more units may be integrated into one unit.

According to the descriptions of the foregoing implementations, a person skilled in the art may clearly understand that the foregoing method embodiments may be implemented by using software and a required universal hardware platform, or may be implemented by using hardware. In some embodiments, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

A person of ordinary skill in the art may understand that all or some of the processes in the methods in the foregoing embodiments may be implemented by using a computer program to control related hardware. The program may be stored in a computer readable storage medium. When the program is executed, the processes in the foregoing methods embodiments may be performed. The storage medium includes a magnetic disk, a compact disc, an ROM, an RAM, or the like.

It may be understood that the embodiments described in the embodiments of the present disclosure may be implemented by hardware, software, firmware, middleware, microcode, or a combination thereof. For hardware implementation, a module, a unit, a subunit, or the like may be implemented in one or more Application Specific Integrated Circuits (ASICs), a Digital Signal Processor (DSP), a DSP Device (DSPD), a Programmable Logic Device (PLD), a Field-Programmable Gate Array (FPGA), a general purpose processor, a controller, a microcontroller, a microprocessor, another electronic unit configured to perform the functions described in the present disclosure, or a combination thereof.

For software implementations, the techniques described in the embodiments of the present disclosure may be implemented by modules (for example, processes and functions) that perform the functions described in the embodiments of the present disclosure. The software code may be stored in a memory and executed by a processor. The memory may be implemented in or outside the processor.

The embodiments of this application are described with reference to the accompanying drawings. However, this application is not limited to the foregoing implementations.

The foregoing implementations are merely examples, but are not limiting. A person of ordinary skill in the art may make many forms without departing from the objective and the scope of the claims of this application, and these forms all fall within the protection scope of this application.

The invention claimed is:

1. A facial image generation method performed by an electronic device, comprising:
   obtaining a facial contour of a target user wearing an Augmented Reality (AR) device, wherein the facial contour of the target user is determined by:
      performing contour imaging of the face of the target user with different depths of field to obtain multiple contour images of the face of the target user, and
      superposing the obtained multiple contour images to obtain the facial contour of the target user;
   determining a facial angle of the target user based on the facial contour of the target user while wearing the AR device, wherein the facial angle comprises an angle between a face orientation of the target user and the electronic device, wherein determining the facial angle further comprises:
      matching the facial contour of the target user to one of multiple facial contours of the target user that are pre-recorded and stored in a facial contour database, wherein each of the pre-recorded contours of the target user in the facial contour database corresponds to a respective facial angle; and
      determining the facial angle at which the one of the multiple facial contours of the target user is matched,
   obtaining a target facial expression; and
   generating a facial image of the target user based on the target facial expression and the facial angle,
   wherein when a plurality of target users each wears an AR device, a facial image is generated for each of the plurality of target users, wherein each target user is bound with a facial image generation function by using a respective preset gesture action,
   wherein when the facial image is locked by the target user wearing the AR device, the facial image has no changes.

2. The facial image generation method according to claim 1, wherein the obtaining a target facial expression comprises:
   obtaining a facial expression of the target user that is recorded by the AR device;
   or
   obtaining input information of the target user, and matching a facial expression corresponding to context of the input information from a facial expression database; wherein
   the facial expression database comprises multiple facial expressions at multiple facial angles.

3. The facial image generation method according to claim 1, wherein before the generating a facial image of the target user based on the target facial expression and the facial angle, the method further comprises at least one of the following:
   obtaining a mouth state of the target user, and adjusting a mouth state of the target facial expression based on the mouth state of the target user; or
   obtaining a voice tone of the target user, and adjusting an expression amplitude of the target facial expression based on the voice tone.

4. The facial image generation method according to claim 1, further comprising:
   receiving a first input of the target user; and
   replacing the facial image of the target user with a preset image in response to the first input; wherein
   the preset image comprises at least one of the following:
   a cartoon emoticon image; or
   an image corresponding to the first input of the target user.

5. An electronic device comprising a memory having a computer program stored thereon; and a processor, wherein the computer program, when executed by the processor, causes the processor to perform a facial image generation method, comprising:
   obtaining a facial contour of a target user wearing an Augmented Reality (AR) device, wherein the facial contour of the target user is determined by:
      performing contour imaging of the face of the target user with different depths of field to obtain multiple contour images of the face of the target user, and
      superposing the obtained multiple contour images to obtain the facial contour of the target user;
   determining a facial angle of the target user based on the facial contour of the target user while wearing the AR device, wherein the facial angle comprises an angle between a face orientation of the target user and the electronic device, wherein determining the facial angle further comprises:
      matching the facial contour of the target user to one of multiple facial contours of the target user that are pre-recorded and stored in a facial contour database, wherein each of the pre-recorded contours of the target user in the facial contour database corresponds to a respective facial angle; and
      determining the facial angle at which the one of the multiple facial contours of the target user is matched,
   obtaining a target facial expression; and
   generating a facial image of the target user based on the target facial expression and the facial angle,
   wherein when a plurality of target users each wears an AR device, a facial image is generated for each of the plurality of target users, wherein each target user is bound with a facial image generation function by using a respective preset gesture action,
   wherein when the facial image is locked by the target user wearing the AR device, the facial image has no changes.

6. The electronic device according to claim 5, wherein the obtaining a target facial expression comprises:
   obtaining a facial expression of the target user that is recorded by the AR device; or
   obtaining input information of the target user, and matching a facial expression corresponding to context of the input information from a facial expression database, wherein
   the facial expression database comprises multiple facial expressions at multiple facial angles.

7. The electronic device according to claim 5, before the generating a facial image of the target user based on the target facial expression and the facial angle, the method further comprises at least one of the following:
   obtaining a mouth state of the target user, and adjusting a mouth state of the target facial expression based on the mouth state of the target user; or
   obtaining a voice tone of the target user, adjusting an expression amplitude of the target facial expression based on the voice tone.

8. The electronic device according to claim 5, the method further comprises:
- receiving a first input of the target user; and
- replacing the facial image of the target user with a preset image in response to the first input, wherein
- the preset image comprises at least one of the following:
- a cartoon emoticon image; or
- an image corresponding to the first input of the target user.

9. A non-transitory computer-readable storage medium storing a computer program or an instruction that, when executed by a processor, causes the processor to perform a facial image generation method, comprising:
- obtaining a facial contour of a target user wearing an Augmented Reality (AR) device, wherein the facial contour of the target user is determined by:
  - performing contour imaging of the face of the target user with different depths of field to obtain multiple contour images of the face of the target user, and
  - superposing the obtained multiple contour images to obtain the facial contour of the target user;
- determining a facial angle of the target user based on the facial contour of the target user while wearing the AR device, wherein the facial angle comprises an angle between a face orientation of the target user and the electronic device, wherein determining the facial angle further comprises:
  - matching the facial contour of the target user to one of multiple facial contours of the target user that are pre-recorded and stored in a facial contour database, wherein each of the pre-recorded contours of the target user in the facial contour database corresponds to a respective facial angle; and
  - determining the facial angle at which the one of the multiple facial contours of the target user is matched,
- obtaining a target facial expression; and
- generating a facial image of the target user based on the target facial expression and the facial angle,
- wherein when a plurality of target users each wears an AR device, a facial image is generated for each of the plurality of target users, wherein each target user is bound with a facial image generation function by using a respective preset gesture action,
- wherein when the facial image is locked by the target user wearing the AR device, the facial image has no changes.

10. The non-transitory computer-readable storage medium according to claim 9, wherein the obtaining a target facial expression comprises:
- obtaining a facial expression of the target user that is recorded by the AR device;
- or
- obtaining input information of the target user, and matching a facial expression corresponding to context of the input information from a facial expression database; wherein
- the facial expression database comprises multiple facial expressions at multiple facial angles.

11. The non-transitory computer-readable storage medium according to claim 9, wherein before the generating a facial image of the target user based on the target facial expression and the facial angle, the method further comprises at least one of the following:
- obtaining a mouth state of the target user, and adjusting a mouth state of the target facial expression based on the mouth state of the target user; or
- obtaining a voice tone of the target user and adjusting an expression amplitude of the target facial expression based on the voice tone.

12. The non-transitory computer-readable storage medium according to claim 9, the method further comprises:
- receiving a first input of the target user; and
- replacing the facial image of the target user with a preset image in response to the first input; wherein
- the preset image comprises at least one of the following:
- a cartoon emoticon image; or
- an image corresponding to the first input of the target user.

* * * * *